US006815495B2

(12) United States Patent
Marten et al.

(10) Patent No.: US 6,815,495 B2
(45) Date of Patent: Nov. 9, 2004

(54) COATING OF MELAMINE, EPOXY, URETHANE OR ALKYD RESIN WITH PHENOLIC RESIN BINDER

(75) Inventors: Anita Marten, Blaustein (DE); Daniela Maichel, Lauterstein (DE)

(73) Assignee: DaimlerChrysler AG, Stuttgart (DE)

( * ) Notice: Subject to any disclaimer, the term of this patent is extended or adjusted under 35 U.S.C. 154(b) by 362 days.

(21) Appl. No.: 09/858,912

(22) Filed: May 17, 2001

(65) Prior Publication Data

US 2002/0022091 A1 Feb. 21, 2002

(30) Foreign Application Priority Data

May 17, 2000 (DE) .......................................... 100 24 256

(51) Int. Cl.[7] .......................... C08K 3/20; C08L 61/10; C08L 61/12
(52) U.S. Cl. ...................... 524/596; 523/451; 523/456; 523/459; 524/591; 524/598; 524/601; 525/442; 525/456; 525/481; 525/504
(58) Field of Search ................................ 523/451, 456, 523/459; 524/591, 596, 598, 601; 525/598, 601, 442, 456, 481, 504

(56) References Cited

U.S. PATENT DOCUMENTS

| 4,347,335 A | * | 8/1982 | Thomas ...................... 524/538 |
| 4,368,299 A | * | 1/1983 | Watanabe et al. ............ 525/481 |
| 5,043,380 A | * | 8/1991 | Cole ........................... 524/510 |
| 5,063,258 A | * | 11/1991 | Babler ......................... 523/171 |
| 5,147,729 A | | 9/1992 | Ogishi ......................... 428/623 |
| 5,578,669 A | * | 11/1996 | Odawa et al. ............... 524/414 |
| 5,624,978 A | * | 4/1997 | Soltwedel et al. .......... 523/402 |
| 5,733,386 A | * | 3/1998 | Yoshida et al. .............. 148/251 |

FOREIGN PATENT DOCUMENTS

| DE | 1940487 | 12/1971 |
| DE | 69511393 | 4/2000 |
| EP | 0659855 | 6/1995 |
| EP | 0826747 | 3/1998 |
| EP | 0846733 | 6/1998 |
| JP | 61-250024 A2 * | 11/1986 |
| JP | 62-22815 A2 * | 1/1987 |
| JP | 1452826 A1 * | 1/1989 |
| JP | 7-133405 A * | 5/1995 |
| WO | 99/37722 | 7/1999 |
| WO | 01/34713 | 5/2001 |

* cited by examiner

Primary Examiner—Robert Sellers
(74) Attorney, Agent, or Firm—Crowell & Moring LLP

(57) ABSTRACT

A coating solution for producing a cured coating, particularly for metallic surfaces, includes (1) a binder containing organic polymers with optional organic or inorganic addictions and (2) at least one of a melamine resin, an epoxy resin, a polyurethane resin, an alkyd resin, or mixtures thereof. The coating solution, in the liquid state, contains water. The binder contains 50–100% phenolic resin, preferably based on phenol and/or resorcinol.

21 Claims, No Drawings

COATING OF MELAMINE, EPOXY, URETHANE OR ALKYD RESIN WITH PHENOLIC RESIN BINDER

BACKGROUND AND SUMMARY ON INVENTION

This application claims the priority of German application No. 100 24 256.1, filed May 17, 2000, the disclosure of which is expressly incorporated by reference herein.

The present invention relates to a coating solution comprising two or more starting materials for producing a cured coating for preferably metallic surfaces.

In the automotive industry in particular it is common to pretreat metal panels that are intended for later painting. The coats are applied in a multistage process which may include several drying and/or setting phases. The coats include, for example, a corrosion protection coat (e.g., a phosphate coat) and a primer. The application of these coats, or at least some of them, is costly and in some cases may give rise to environmental problems owing to solvents and/or heavy metals.

It is an object of the present invention to prepare a coating solution with which the overall application process is simplified and made less expensive while at the same time the environmental acceptability of the coating solution and of the coating which results from curing the coating solution, is increased as much as possible.

The object is achieved with a coating solution according to the present invention. The aqueous or water-containing coating solution of the present invention comprises a curable, organic-polymeric coating solution which can be employed substantially universally and has a protective and/or anticorrosive and/or adhesion-promoting activity. The coating solution of the present invention is used preferably on bare and/or pretreated and/or precoated metal surfaces and is acceptable in particular to the requirements in car-making. The liquid coating solution may be applied to a large extent universally to any desired substrates, preferably metallic substrates such as, for example, steel, aluminium, magnesium, corresponding alloys, or galvanized steel, directly or else following common pretreatment techniques such as galvanizing, phosphating and chromating, for example.

By the present invention, it is possible to simplify the present very different starting materials and/or coating techniques and/or processes. This simplification is done by omitting process steps, one of the consequences of which is that costs are lowered.

Furthermore, it is possible to use more favorably priced starting materials.

Additionally, the coatings may be applied at lower film thicknesses, as a result of which, for example, the environmental acceptability is improved.

Also of particular advantage with a view to environmental acceptability is that for these coating solutions it is generally possible to forgo additions of heavy metal as a starting material.

In the case of acidic solutions, it is even possible to a large extent to forgo organic solvents. In the case of alkaline solutions, it is even possible to a greater extent to use water as a solvent.

DETAILED DESCRIPTION OF INVENTION

The base formulation of the coating solution of the present invention is, uniformly, an aqueous and thus eco-friendly coating solution which can be used universally on substrate materials that are relevant to car-making.

The coating solution comprises a phenolic resin as its binder, preferably on a phenol and/or resorcinol basis, configured as a resol or novolak type. Other resins or constituents such as melamine resin, epoxy resin, casein, alkyd resin, polyurethane resin, and the like may be added.

The coating solution may further comprise (1) a solvent, which is preferably water; (2) a curing agent, if required; and (3) when required, further substances, e.g., alcohols, preferably 1,2-diols, phosphonic acids, and organic or inorganic phosphates.

The starting materials used or added are generally comparable with or more favorable in terms of their production cost than the starting materials used to date.

Since, in general, thinner coats lead to a comparable result, it is possible to use smaller volumes of material, which is manifested not only in the overall price, but also as a weight saving on the finished car.

A further ecological advantage is provided by the coating process, which is a replacement for expensive and laborious deposition and application processes. Preferable coating processes are dipping, rolling, or spraying in the case of present invention.

Using the base formulation, it is possible to coat materials customary in car-making, especially metallic materials.

For specific parts or for specific demands and requirements, it may be appropriate to modify the base formulation. In this case, the compatibility with other variants derived from the base formulation, and with the base formulation itself, is generally obtained.

Process steps are saved according to the present invention in that the curable coating is produced in one stage. In contrast, according to current practice in car-making, the pretreatment generally proceeds in a plurality of stages, in the form, for example, of activation, phosphation, and electrodeposition (dipcoating) as well as rinsing steps in between.

The present invention is illustrated with reference to the examples shown below.

EXAMPLE 1

24 g water-thinnable phenolic resol resin (from Bakelite);
6 g water-thinnable melamine resin (from Vianova);
2 g 1,2-octanediol;
5 g 1,2-hexanediol;
is made up to 100 g with water.

EXAMPLE 2

18 g water-thinnable phenolic resol resin (from Bakelite);
2 g water-thinnable melamine resin (from Vianova);
2 g 1,2-octanediol;
5 g 1,2-hexanediol;
1 g zinc glycerophosphate;
is made up to 100 g with water.

EXAMPLE 3

27 g water-thinnable phenolic resol resin (from Bakelite);
3 g water-thinnable melamine resin (from Vianova);
2 g 1,2-octanediol;
5 g 1,2-hexanediol;
1 g cyanuric acid;
2 g zinc phosphate;
is made up to 100 g with water.

EXAMPLE 4

24 g water-thinnable phenolic resol resin (from Bakelite);
3 g water-thinnable melamine resin (from Vianova);
3 g water-thinnable alkyd resin (from Vianova);
2 g 1,2-octanediol;
5 g 1,2-hexanediol;
is made up to 100 g with water.

EXAMPLE 5

12 g phenolic resin, novolak type (from Bakelite);
3 g water-thinnable melamine resin (from Vianova);
2 g decanediol;
10 g 1,2-hexanediol;
25 g methoxyethanol;
10 g pentanol;
2 g hexamethylenetetramine;
is made up to 100 g with water.

EXAMPLE 6

15 g phenolic resin, novolak type (from Bakelite);
2 g decanediol;
10 g 1,2-hexanediol;
25 g methoxyethanol;
10 g pentanol;
2 g hexamethylenetetramine;
0.2 g 1-hydroxyethane-1,1-diphosphonic acid;
wetting agent;
is made up to 100 g with water.

EXAMPLE 7

20 g phenolic resin, novolak type (from Bakelite);
2 g decanediol;
10 g 1,2-hexanediol;
25 g methoxyethanol;
10 g pentanol;
2 g hexamethylenetetramine;
2 g triallyl cyanurate;
is made up to 100 g with water.

EXAMPLE 8

20 g phenolic resin, novolak type (from Bakelite);
2 g decanediol;
10 g 1,2-hexanediol;
25 g methoxyethanol;
10 g pentanol;
2 g hexamethylenetetramine;
1 g 2,4-dihydroxybenzaldehyde;
is made up to 100 g with water.

EXAMPLE 9

20 g phenolic resin, novolak type (from Bakelite);
1 g zinc glycerophosphate;
2 g decanediol;
10 g 1,2-hexanediol;
20 g methoxyethanol;
10 g pentanol;
2 g hexamethylenetetramine;
1 g 2,4-dihydroxybenzaldehyde;
2 g triallyl cyanurate;
1 g cyanuric acid;
2 g zinc phosphate;
0.2 g 1-hydroxyethane-1,1-diphosphonic acid;
wetting agent;
is made up to 100 g with water.

EXAMPLE 10

9 g water-thinnable phenolic resol resin (from Bakelite);
1 g water-thinnable melamine resin (from-Vianova);
2 g 1,2-octanediol;
5 g 1,2-hexanediol;
5 g conductivity pigment;
is made up to 100 g with water.

EXAMPLE 11

10 g phenolic resin, novolak type (from Bakelite);
2 g decanediol;
10 g 1,2-hexanediol;
20 g methoxyethanol;
5 g pentanol;
1 g hexamethylenetetramine;
30 g conductivity pigment;
is made up to 100 g with water.

The coating solutions were used to coat cleaned parts of various grades of steel, and/or phosphated steel, and/or galvanized steel, and/or aluminium, and/or various aluminium alloys, by dipping and/or rolling and/or spraying.

Subsequently, a cured coating was produced thermally at 160–200° C. between 0–30 min. Thereafter, the coated parts were subjected to common tests with regard to deformability and/or corrosion resistance and/or other properties.

Some of the samples were coated and/or painted further, for example, with clearcoat or an OEM coating system. The applied paint coat was damaged, for example by scoring, and the customary test procedures for corrosion resistance were carried out.

In the course of these experiments, the coated substrates gave results at least comparable with those of conventionally-coated substrates.

A variety of embodiments of coating solutions may be employed. Occasionally, multiple applications are also necessary, with very good compatibility of the individual coatings with one another.

Advantageously, it is possible to add 1,2-diol to all coating solutions, regardless of whether the phenolic resin is of the resol type or novolak type, and irrespective of the resin additions.

Phosphonic acids and (Zn) phosphates improve the results for steel and its derivatives. For aluminium substrates, additions of zirconium and titanium fluoro complexes may be made.

The 1,2-diols, present in liquid form and/or as solutions of solid 1,2-diols or solutions of solid 1,2-diols in liquid 1,2-diols, are advantageous in all of the coating solutions. The 1,2-diols increase elasticity of the coating. They are used in particular as solvents, reactive diluents, coating auxiliaries, film formation auxiliaries, and plasticizers.

Function of phosphonic acid

Through the use of phosphonic acid, it is possible to build together a plurality of process steps into one step. Small and highly polar phosphonic acid molecules diffuse from the liquid coating solution preferentially to the metal surface, while the large and immobile molecules of the polymer solution come to lie above them and cover the underlying material (comparable to a phase separation).

A further advantage is that, as a result of acidic attack (phosphonic acids are highly acidic) from very slight etching, iron ions are formed on the metal surface. The iron ions immediately react with the attacking phosphonic acid to give a highly insoluble iron phosphonate coat which forms an attractive protective coat, comparable to phosphating.

A small amount of zinc provides zinc ions and zinc phosphonate as well as iron phosphonate. In contrast to phosphating, however, the phosphonic acids carry an organic radical. The organic radical, which may carry free hydroxyl groups, may be drawn chemically into the curing reaction of the resin in a condensation reaction with the elimination of water. The water formed is not disruptive, but instead evaporates together with the water which is added in any case. The environment must be aqueous and polar, since otherwise the phosphonic acid is not present in distribution, or not in uniform distribution, in the coating solution.

In contrast to phosphating, the phosphonate coat and the resin coat are chemically linked with one another after curing and form a better barrier than two separate coats. The phosphonate coat lies squarely on the surface and the protective resin lies finely over it, properly cured and thinner than in the prior art, and all in a single-stage coating.

Organic phosphoric acids and phosphates have similar properties to the phosphonic acids and phosphonates with the difference that they have a predetermined breakage point. They are likewise polar and, depending on molecular size, diffuse faster or slower to the metal surface where they form protective coats with iron ions.

On ingress of water and oxygen, the organic phosphate hydrolyses, i.e. the protective coat is attacked. This does not happen with phosphonates. Subsequently, however, together with the iron ions which form, iron phosphate of low solubility is formed again. In this way, the finished coating is able to have a self-healing effect. All that is needed is to chemically bond the phosphate, preferably used as the free acid or as a zinc salt, to large and immobile resin molecules, preferably aliphatic (to a C chain) rather than aromatic (to a benzene ring), since the subsequently desired hydrolysis takes place more readily on the aliphatic structure. Accordingly, in the course of coating, phosphate tends not to pass onto the metal surface but instead tends to be oriented towards the metal surface, is embedded in the resin, and forms a phosphate depot, which is available precisely when it is needed.

If the finished coating is later damaged, corrosion can only take place if water and oxygen are acting. At the same time, however, the phosphate bonded in the resin comes into contact with water and oxygen, and an alkali-catalysed hydrolysis takes place, in which phosphate ions are released. These phosphate ions can then react with zinc ions from the zinc present in the coat, or with iron ions that are formed, to form a new coat, which mechanically seals the damage.

In the configuration comprising the organic phosphates, therefore, these phosphates remain in the resin coat, where they form a depot. In the case of subsequent damage, a chemical reaction takes place, with the participation of incoming water and oxygen, which is accompanied by the formation of a new protective coat.

Resorcinol and/or 3-methoxyphenol and/or 1,3-dimethoxybenzene may be monomers of the resin building blocks used, or derivatives thereof. With these substances, or with oligomers or precondensates in which they are present, better crosslinking and thus improved corrosion protection is achieved.

At the same time, these components exhibit better solubility in water, i.e. a higher water fraction and a lower organic solvent fraction is possible in the coating solution, which becomes more eco-friendly.

2,4-Dihydroxybenzaldehyde and triallyl cyanurate are monomeric additives which likewise permit higher crosslinking. Cyanuric acid in combination with zinc ions is a corrosion inhibitor. Montmorillonite is an inorganic, mica-like product which possesses the ability to swell and thus acts as a thickener, but is otherwise unreactive.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A coating solution, comprising:
   water;
   at least one of a melamine resin, a polyurethane resin, an alkyd resin, or mixtures thereof; and
   a binder comprising 50–100 wt. % of a phenolic resin comprising phenol and resorcinol as monomers for the resin building blocks.

2. A coating solution according to claim 1, wherein the coating solution comprises:
   5–70% by weight of the binder;
   0–40% by weight a curing agent;
   15–95% by weight water; and
   0–65% by weight of organic and/or inorganic additives.

3. A coating solution according to claim 1, wherein the coating solution further comprises up to 65% by weight of at least one of an organic solvent, an alcohol, an alcohol mixture, or a polyol.

4. A coating solution according to claim 1, wherein the coating solution comprises up to 65% by weight of a liquid or solid polyhydric alcohol.

5. A coating solution according to claim 1, wherein the polyhydric alcohol is a 1,2-diol having at least 5 carbon atoms.

6. A coating solution according to claim 1, wherein the coating solution further comprises up to 20% of a phosphonic acid.

7. A coating solution according to claim 6, wherein the phosphonic acid is unbound.

8. A coating solution according to claim 6, wherein a residue chain of a functional group of the phosphonic acid has at least one of a crosslinkable hydroxyl or amine group.

9. A coating solution according to claim 8, wherein a pH of the coating solution is less than 7.

10. A coating solution according to claim 9, wherein a pH of the coating solution is in the range 5–6.

11. A coating solution according to claim 9, wherein the coating solution further comprises up to 40% by weight of at least one of organic or inorganic phosphates.

12. A coating solution according to claim 11, wherein the at least one of organic or inorganic phosphates is present either as reactive monomer or is attached to at least one of a resin oligomer, a prepolymer, or a reactive or unreactive resin polymer.

13. A coating solution according to claim 12, wherein the at least one of organic or inorganic phosphates is attached as an intermediate link and not to an aromatic.

14. A coating solution according to claim 12, wherein the at least one of organic or inorganic phosphates is present as a Zn salt or in combination with an amount of zinc.

15. A coating solution according to claim 12, further comprising at least one of titanium ions, zirconium ions, or fluoride ions.

16. A coating solution according to claim 6, wherein, when a concentration of phosphonic acids is greater than zero, up to 65% by weight organically-bonded phosphate is added.

17. A coating solution according to claim 16, wherein the organically-bonded phosphate is at least one of a polymer, a precondensate, or an oligomer.

18. A coating solution according to claim 1, wherein the coating solution comprises up to 65% by weight organic additives or inorganic additives that exhibit an electrical conductivity.

19. A coating solution according to claim 1, wherein the coating solution comprises up to 65% by weight of an organic or inorganic additive selected from the group consisting of Zn powders, Zn ions, phosphate ions, resorcinol 3-methoxyphenol, 1,3-dimethoxybenzene, and combinations thereof.

20. A coating solution according to the claim 19, wherein the organic or inorganic additive is at least one of a monomer, an oligomer, or a precondensate.

21. A coating solution according to claim 1, wherein the coating solution comprises up to 65% by weight of an organic or inorganic additive selected from the group consisting of 2,4-dihydroxybenzaldehyde, cyanuric acid, triallyl cyanurate, montmorillonite, montmorillonite-containing additives, active bentonite, and combinations thereof.

* * * * *